United States Patent [19]

Watt et al.

[11] Patent Number: 5,199,842
[45] Date of Patent: Apr. 6, 1993

[54] WHEELCHAIR CARRIER

[76] Inventors: Jerry L. Watt, R.R. #2, Wapakoneta, Ohio 45895; Dennis J. Watt, Box 7172, Lafayette, Ohio 45854

[21] Appl. No.: 696,879

[22] Filed: May 8, 1991

[51] Int. Cl.$^5$ .................................................. B60P 3/06
[52] U.S. Cl. ................................. 414/537; 414/462; 414/480; 414/921; 224/42.03 R; 224/42.08; 224/42.44
[58] Field of Search ................ 414/462, 469, 480, 537, 414/921; 224/42.03 R, 42.03 A, 42.03 B, 42.07, 42.08, 42.13, 42.2, 42.43, 42.44

[56] References Cited

U.S. PATENT DOCUMENTS

| | | | |
|---|---|---|---|
| 3,822,798 | 7/1974 | Neff | 414/537 |
| 4,046,297 | 9/1977 | Bland | 224/42.03 |
| 4,189,274 | 2/1980 | Shaffer | 224/42.03 X |
| 4,213,729 | 7/1980 | Cowles et al. | 224/42.03 X |
| 4,234,284 | 11/1980 | Hauff | 224/42.03 X |
| 4,275,981 | 6/1981 | Bruhn | 224/42.03 X |
| 4,693,289 | 9/1987 | Taylor et al. | 150/52 |
| 4,697,975 | 10/1987 | Lippold | 414/462 |
| 4,705,448 | 11/1987 | Mungons | 414/462 |
| 4,744,590 | 5/1988 | Chesney | 224/42.08 X |
| 4,775,282 | 10/1988 | Van Vliet | 414/921 X |
| 4,792,274 | 12/1988 | Cockram | 414/537 |
| 4,813,584 | 3/1989 | Wiley | 224/42.07 X |
| 4,944,546 | 7/1990 | Keller | 414/537 X |
| 4,971,509 | 11/1990 | Sechovec et al. | 414/921 X |
| 5,018,651 | 5/1991 | Hull et al. | 414/462 X |
| 5,029,740 | 7/1991 | Cox | 224/42.03 X |

FOREIGN PATENT DOCUMENTS 8002785 12/1981 Netherlands ................ 414/462

Primary Examiner—Michael S. Huppert
Assistant Examiner—James Keenan
Attorney, Agent, or Firm—Allen D. Gutchess, Jr.

[57] ABSTRACT

A wheelchair carrier attaches to the back of a vehicle for transporting a wheelchair. A supporting frame attaches to a trailer hitch or the like and can pivot upwardly, out of the way, when not in use. A wheelchair housing is detachably mounted on the supporting frame by a flange and rod arrangement to enable the wheelchair to be quickly mounted and removed. The wheelchair housing has a long opening at the side which is closed off by an elongate door. The door is pivoted at the bottom and swings downwardly to serve as a ramp by means of which the wheelchair can be moved into and out of the housing with minimal effort. The carrier can also be used for other vehicles for non-ambulatory people, such as small self-propelled scooters.

12 Claims, 3 Drawing Sheets

WHEELCHAIR CARRIER

This invention relates to a carrier to be mounted on a vehicle, particularly for transporting a wheelchair.

Elderly and handicapped people, when being driven from one location to another, frequently require that they be accompanied by a wheelchair. Relatively few destinations have wheelchairs available for temporary use. Particularly with older, larger automobiles, the wheelchairs could be carried in the trunks. However, automobiles with sufficiently large trunks for this purpose are now infrequently found.

The present invention provides a wheelchair carrier which can be mounted on the rear of a vehicle rather quickly and can be similarly removed in minimal time. A wheelchair can be inserted in and removed from a wheelchair housing of the carrier with minimal effort and time. Toward this purpose, the wheelchair housing has a side door which swings downwardly and serves as a ramp by means of which the wheelchair can be rolled into and out of the housing. Thus, there is no need to physically lift the wheelchair into the back of a van or station wagon.

The wheelchair carrier, in addition to having the door serving as a ramp, has a flange and pin design which enables the wheelchair housing to be quickly attached to and removed from a supporting frame. The supporting frame is pivotally connected to a conventional trailer hitch drawbar and can be swung up and out of the way when the carrier is not in use. For less frequent use, the supporting frame can be easily unbolted from the hitch bar and easily attached thereto when the need arises again.

It is, therefore, a principal object of the invention to provide a wheelchair carrier which can be mounted on the rear of a vehicle.

Another object of the invention is to provide a wheelchair carrier with a housing having a side door which can pivot downwardly and serve as a ramp for the wheelchair.

Yet another object of the invention is to provide a wheelchair carrier having a wheelchair housing and a supporting frame which can be quickly and easily attached to and separated from one another.

Still a further object of the invention is to provide a wheelchair carrier having a supporting frame which can be pivoted out of the way when the carrier is not in use.

Other objects and advantages of the invention will be apparent from the following detailed description of a preferred embodiment thereof, reference being made to the accompanying drawings, in which.

Figure 1:
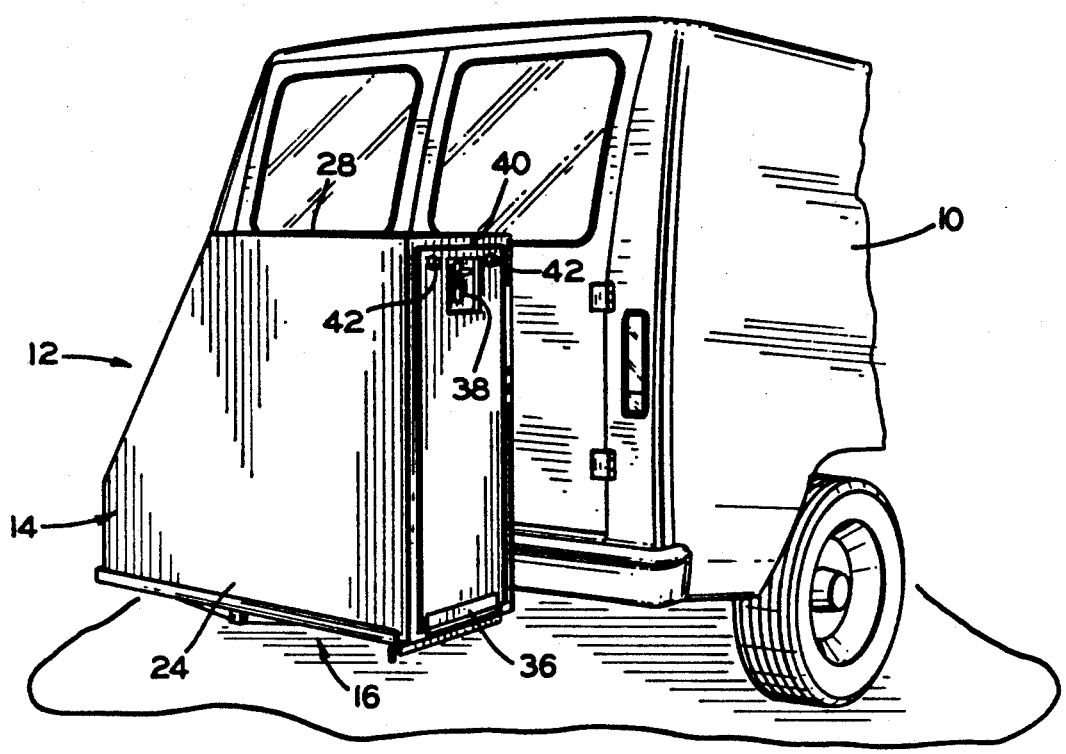
FIG. 1 is a fragmentary, rear view in perspective of a vehicle with a wheelchair carrier in accordance with the invention mounted on the rear thereof.
Figure 2:
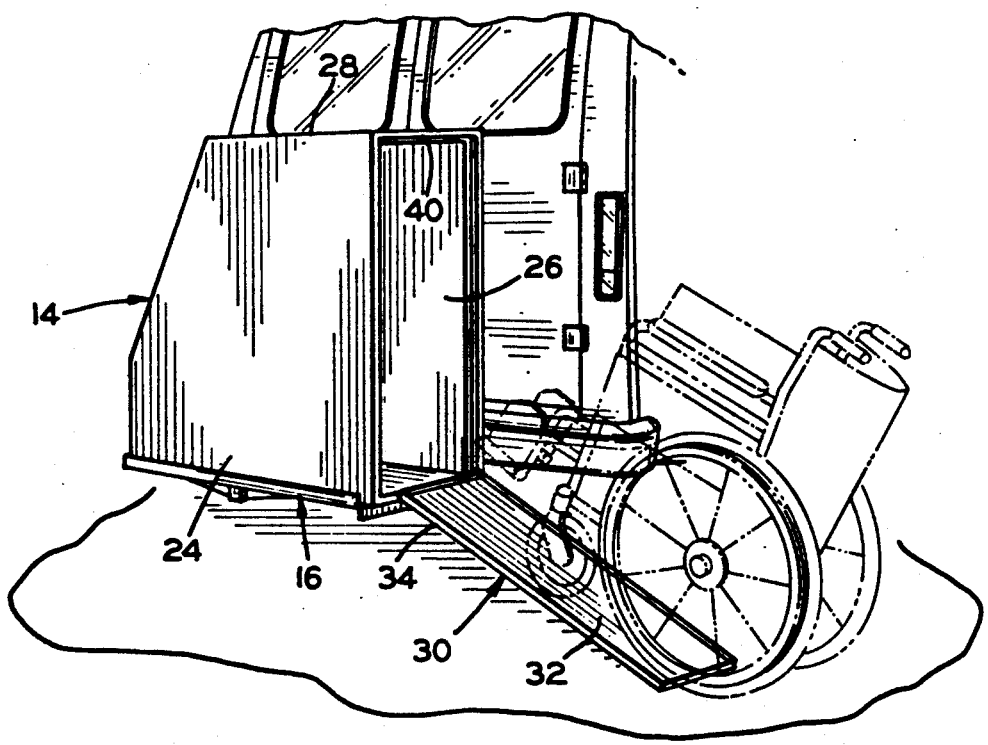
FIG. 2 is a view similar to FIG. 1 but with a door of the wheelchair carrier open and a wheelchair, in dotted lines, being inserted in or removed from a wheelchair housing.

Referring to the drawings, and more particularly to FIGS. 1 and 2, a vehicle 10 is shown with a wheelchair carrier 12 in accordance with the invention mounted on the rear thereof. The wheelchair carrier includes a housing 14 attached to a supporting frame 16. The wheelchair housing 14 can be of molded plastic or fiberglass reinforced plastic or can consist of a metal frame with fabric therearound, by way of example. Preferably, the housing 12 should be reasonably waterproof and light in weight. When a wheelchair is being transported in the housing 14, it is completely protected from the weather.

As shown, the housing 14 is of one-piece construction and includes a bottom 18 (FIG. 3), a left upright end wall 20, a slanted end wall 22, two side walls 24 and 26 (FIGS. 1-3), and a top 28. The housing has an elongate opening at the right end to accommodate a wheelchair. A long door 30 also constitutes a right end wall for the housing 12. The door 30 includes a panel 32 with side flanges 34 which add stiffness to the door. The door has a lower edge which is pivotally connected to an end of the housing bottom 18 by a piano hinge 36. A suitable commercially-available latch 38 (FIG. 1) is mounted near the outer or upper end of the door 30, which latch cooperates with a lip 40 extending downwardly from the top 28 to maintain the door 30 in a closed position, when closed. A pair of bumpers 42 can be affixed to the door panel 32 on either side of the latch 38 to contact the ground when the door 30 is open and serve as a ramp, as shown in FIG. 2.

The wheelchair carrier housing 14 can be quickly attached to and detached from the supporting frame 16. Toward this purpose, the housing has an attaching flange 44 (FIG. 3) extending outwardly beyond the end wall 20. At the opposite end, the housing has a downwardly-extending flange 46 to which are affixed aligned tubes 48 located below the piano hinge 36.

Figure 5:
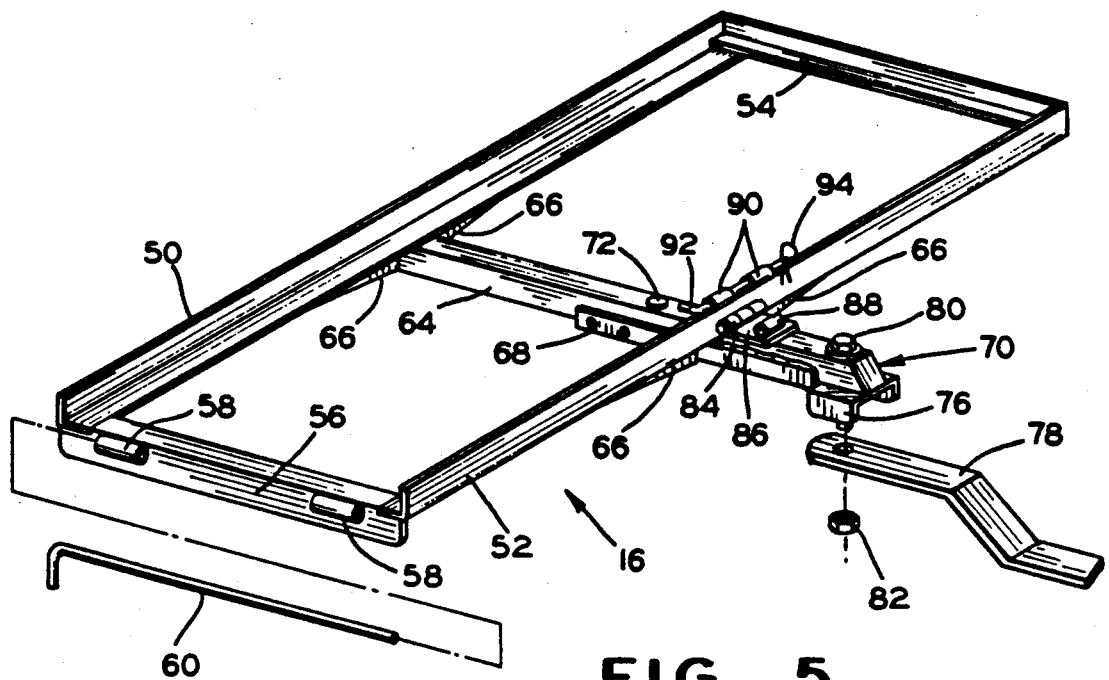
FIG. 5 is an exploded view in perspective of a hitch bar and a supporting frame of the wheelchair carrier.
Figure 6:
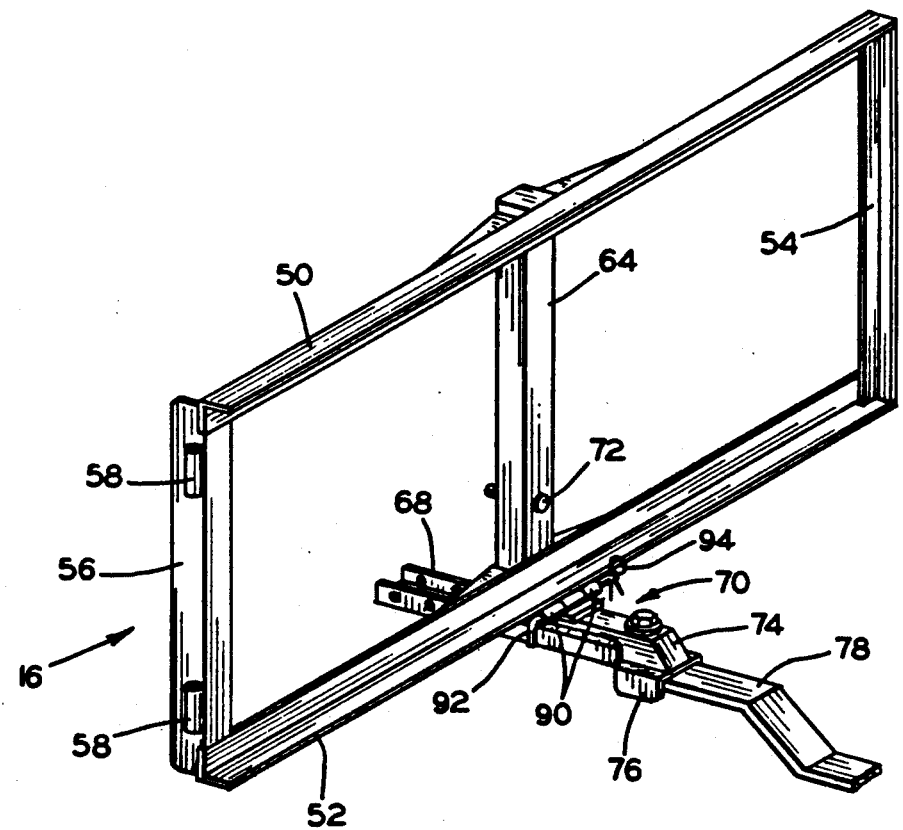
FIG. 6 is a view in perspective of the hitch bar and supporting frame of FIG. 5, showing the frame in an upward, out-of-the-way position.

Referring particularly to FIGS. 5 and 6, the supporting frame 16 can be of welded angle iron construction or otherwise suitably fabricated. It includes longitudinally-extending frame members or angle irons 50 and 52, the length of which approximately equals the width of the wheelchair housing 14. An end frame member or angle iron 54 is affixed to upright flanges of the frame members 50 and 52 and has a horizontal flange located above the horizontal flanges of the frame members 50 and 52 to provide a slot or gap therebetween. An end frame member 56 at the other end of the supporting frame 16 has a downwardly-facing flange to which is affixed two outer aligned tubes 58.

Figure 4:
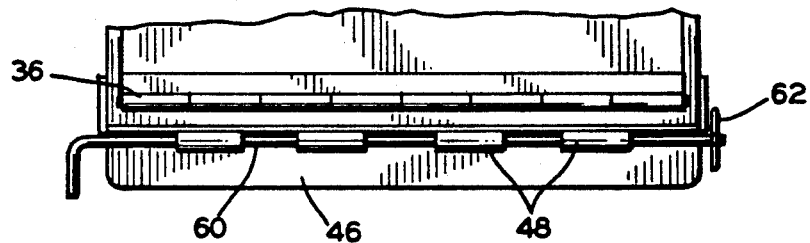
FIG. 4 is a detailed, fragmentary right end view of a lower portion of the wheelchair housing and door of FIG. 3.
Figure 3:
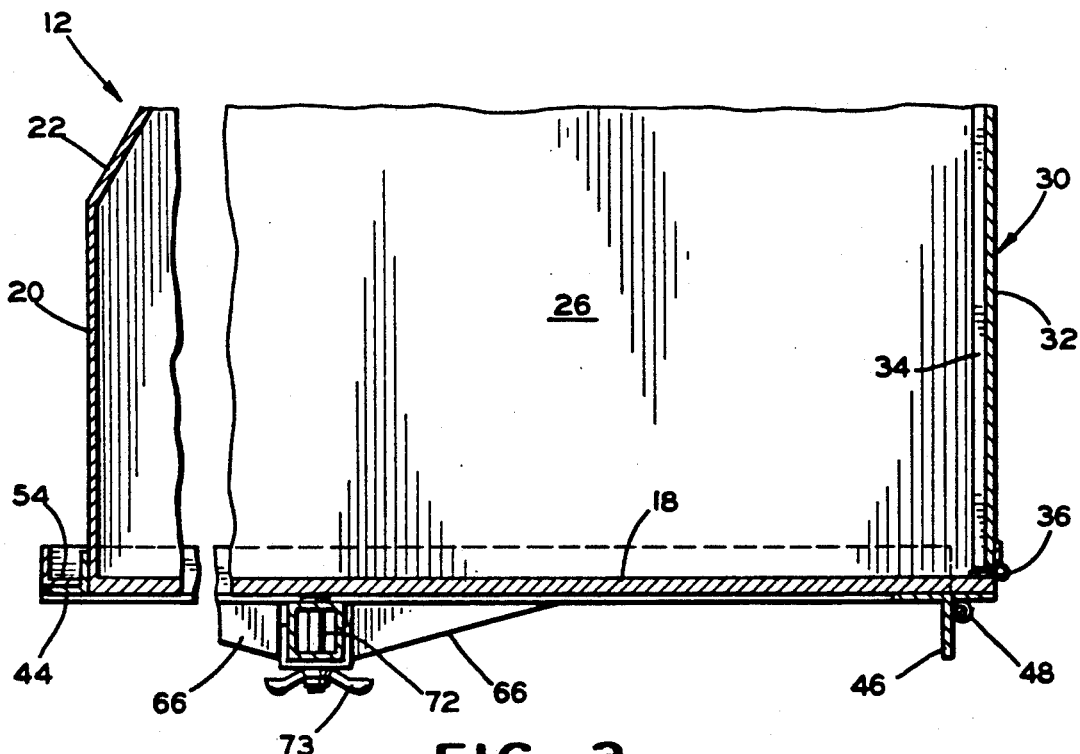
FIG. 3 is an enlarged, fragmentary view in longitudinal cross section taken centrally through the wheelchair carrier of FIGS. 1 and 2.

For attaching the wheelchair carrier housing 14 to the supporting frame 16, the housing 14 is positioned on top of the supporting frame 16 and the attaching end flange 44 is inserted under the end frame 54, as shown in FIG. 3. At the other end, the housing tubes 48 are aligned with the supporting frame tubes 58. An attaching rod 60 (FIGS. 4 and 5) is then inserted through all of the tubes 48 and 58 to provide a secure attachment of the wheelchair carrier housing 14 on the supporting frame 16. For safety, a cotter pin 62 can be inserted through an end portion of the attaching rod 60.

Figure 7:
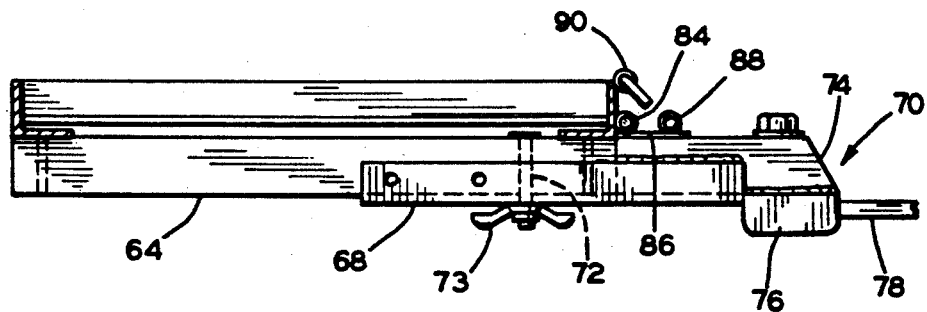
FIG. 7 is a side view in elevation, with parts in section, of the supporting frame of FIGS. 5 and 6 shown mounted on the trailer hitch bar.

To aid in rigidly mounting the wheelchair carrier on the rear of the vehicle 10, the supporting frame 16 has a centrally located transverse frame member or tube 64 which is of rectangular configuration in transverse cross section. The frame member 64 is affixed to the longitudinal frame members 50 and 52 and has gusset plates 66 on both sides. When the supporting frame 16 is in a horizontal position, as shown in FIG. 5, the transverse frame member 64 is received in a U-shaped extension member 68 of a hitch connector 70 and is held in this position by a bolt 72 (FIGS. 5-7) and a large wing nut 73 (FIGS. 3 and 7). The gusset plates on the frame member 52 extend on both sides of the extension member 68. The cooperation of the member 68 with the frame member 64 and the gusset plates provides rigidity and stability for the supporting frame 16 and the housing 14 relative to the vehicle 10. The U-shaped extension 68 is affixed to a connector body 74, by welds. The body 74 has downwardly-extending flanges 76 which extend downwardly on each side of a hitch bar 78. The connector 70 and specifically the connector body 74 is then affixed to the bar 78 by a conventional bolt 80 and a nut 82 (FIG. 5).

A hinge 84 (FIGS. 5 and 7) pivotally connects the supporting frame 16 and the connector 70 and specifically connects the longitudinal frame member 52 to a hinge plate 86 welded on top of the connector body 74. A tube or sleeve 88 is affixed to a forward portion of the hinge plate 86 and two aligned, spaced sleeves 90 are affixed to an upper edge portion of the longitudinal frame member 52. When the supporting frame 16 is in an upright position, as shown in FIG. 6, the tubes 88 and 90 are aligned and a connecting rod or pin 92 is extended through the sleeves to hold the supporting frame in the upper, out-of-the-way position. A safety cotter pin 94 is attached to the end of the connecting rod or pin 92.

The supporting frame 16 and the connector 70 can be quickly removed from the trailer hitch bar 78 by removing the nut 82 from the bolt 80. Hence, the supporting frame 16 can be quickly removed from and attached to the vehicle 10, particularly when the wheelchair is not to be used for a period of time.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. A wheelchair carrier comprising connector means for connecting the carrier to a trailer hitch bar, said connector means having a connector body, a bolt for extending downwardly from said body, and first flange means extending downwardly on each side of said body to extend along sides of the trailer hitch bar, a generally rectangular supporting frame having tube means at one portion and slot means at another portion, means pivotally connecting a central edge portion of said frame and said connector means for pivotal movement of said frame between a generally horizontal position and an upright position, means on said connector means and said frame for holding said frame in the upright position, said connector means having an extension affixed to said connector body and extending under a central portion of said supporting frame when said frame is in the horizontal position, and said supporting frame having a central transverse frame member engagable with said extension when said supporting frame is in the horizontal position to aid in rigidly supporting said supporting frame by said connector means, a wheelchair housing supportable on said frame, said housing having tube means at one portion to cooperate with said tube means on said frame, rod means extendible through both of said tube means to connect and disconnect said one portion of said housing relative to said frame, said housing having second flange means at another portion, said second flange means being extendible into said slot means to connect and disconnect the other portion of said housing to said frame, said housing further comprising wall means forming an enclosure to receive a wheel-chair and forming an elongate opening at one end thereof, an elongate, rigid door, hinge means connecting a lower edge of said door and said housing at a bottom edge of said elongate opening, said door having a closed position closing off said elongate opening and an open position in which an upper edge of said door contacts the ground to form a ramp by means of which a wheelchair can be loaded into said enclosure and unloaded therefrom.

2. A wheelchair carrier according to claim 1 wherein said door has latch means at an upper edge portion engagable with a lip of said housing at an upper edge of said opening to hold said door in the closed position, when closed.

3. A wheelchair carrier according to claim 2 wherein said door has bumpers near the upper edge on each side of said latch means.

4. A wheelchair carrier according to claim 1 wherein said means on said connector means and said frame comprises tubes which are aligned when said frame is in the upright position, and a rod extendable through said tubes, when aligned.

5. A wheelchair carrier according to claim 1 wherein said extension is of U-shaped configuration and said central frame member is of rectangular configuration.

6. A wheelchair carrier according to claim 1 wherein bolt and nut means connect said extension and said central frame member when said supporting frame is in the horizontal position.

7. A wheelchair carrier comprising connector means to connect the carrier to a trailer hitch bar of a vehicle, a supporting frame, means connecting said frame and said connector means, said means connecting said frame and said connector means including a transverse frame member on said supporting frame and an extension on said connector means which receives said transverse frame member when said frame is in a generally horizontal position, a wheelchair housing supportable on said frame, said housing comprising wall means forming an enclosure to receive a wheelchair and forming an elongate opening at one end of the enclosure, said housing and said frame having cooperating means to enable said housing to be connected to and disconnected from said frame, a door for said opening, hinge means connecting a lower edge of said door and said wall means at a bottom edge of said opening, said door having a closed position closing off said opening and an open position in which an upper edge of the door extends downwardly toward the ground to form a ramp by means of which a wheelchair can be loaded into an unloaded from said enclosure.

8. A wheelchair carrier according to claim 7 wherein said means connecting said frame and said connector means includes pivotal means for enabling movement of said frame between a generally horizontal position and a generally upright position.

9. A wheelchair carrier according to claim 8 wherein holding means on said connector means and said frame hold said frame in position when in the upright position.

10. A wheelchair carrier according to claim 7 wherein said cooperating means includes a flange on said housing and slot means on said frame to receive said flange.

11. A wheelchair carrier according to claim 7 wherein said cooperating means comprises tube means carried by said housing and tube means carried by said frame, and rod means insertable through all of said tube means when said housing is supported on said frame.

12. A wheelchair carrier according to claim 9 wherein said holding means comprises tube means on said connector and tube means on said supporting frame, and rod means connecting both of said tube means when said supporting frame is in the upright position.

* * * * *